(12) United States Patent
Scott et al.

(10) Patent No.: US 7,538,680 B2
(45) Date of Patent: May 26, 2009

(54) ALARM SYSTEMS, WIRELESS ALARM DEVICES, AND ARTICLE SECURITY METHODS

(75) Inventors: Ian R. Scott, Duluth, GA (US); Brian J. Green, Atlanta, GA (US); Dennis D. Belden, Jr., Canton, OH (US)

(73) Assignee: Checkpoint Systems, Inc., Thorofare, NJ (US)

( * ) Notice: Subject to any disclaimer, the term of this patent is extended or adjusted under 35 U.S.C. 154(b) by 4 days.

(21) Appl. No.: 11/788,053

(22) Filed: Apr. 19, 2007

(65) Prior Publication Data

US 2008/0018471 A1    Jan. 24, 2008

Related U.S. Application Data

(60) Provisional application No. 60/796,226, filed on Apr. 28, 2006.

(51) Int. Cl.
*G08B 13/14* (2006.01)

(52) U.S. Cl. .................. 340/572.1; 340/10.1; 340/10.3; 340/10.4; 340/572.4; 340/572.5

(58) Field of Classification Search ................. 340/10.1, 340/10.4, 568.1, 571, 572.1
See application file for complete search history.

(56) References Cited

U.S. PATENT DOCUMENTS

| | | | |
|---|---|---|---|
| 3,493,955 A | 2/1970 | Minasy | |
| 4,211,995 A | 7/1980 | Smith | |
| 4,573,042 A | 2/1986 | Boyd et al. | |
| 4,639,713 A | 1/1987 | Kitagawa et al. | |
| 4,686,513 A | 8/1987 | Farrar et al. | |
| 4,698,620 A | 10/1987 | Marshall | |
| 4,746,909 A | 5/1988 | Israel et al. | |
| 4,800,369 A | 1/1989 | Gomi et al. | |
| 4,851,815 A | 7/1989 | Enkelmann | |
| 4,853,692 A | 8/1989 | Wolk et al. | |
| 4,878,045 A | 10/1989 | Tanaka et al. | |
| 4,881,672 A | 11/1989 | Gustafson | |
| 4,980,671 A | 12/1990 | McCurdy | |
| 5,005,125 A | 4/1991 | Farrar et al. | |
| 5,068,643 A | 11/1991 | Yoshina | |

(Continued)

FOREIGN PATENT DOCUMENTS

JP    8279082    10/1996

*Primary Examiner*—George A Bugg
*Assistant Examiner*—Samuel J Walk
(74) *Attorney, Agent, or Firm*—Sand & Sebolt

(57) ABSTRACT

Alarm systems, wireless alarm devices, and article security methods are described according to some aspects of the disclosure. In one aspect, an alarm system includes a base communication device configured to communicate wireless signals, a remote communication device configured to communicate with the base communication device using the wireless signals, wherein the remote communication device is adapted to be associated with an article to be secured and wherein the remote communication device comprises alarm circuitry, wherein the remote communication device comprises a non-linear device configured to detect the wireless signals communicated by the base communication device and to generate electrical signals corresponding to respective ones of the detected wireless signals, and wherein the remote communication device further comprises processing circuitry coupled with the non-linear device and configured to process the electrical signals and to control the alarm circuitry to generate a human perceptible alarm responsive to the processing.

37 Claims, 8 Drawing Sheets

U.S. PATENT DOCUMENTS

| | | |
|---|---|---|
| 5,072,213 A | 12/1991 | Close |
| 5,182,543 A | 1/1993 | Siegel et al. |
| 5,245,317 A | 9/1993 | Chidley et al. |
| 5,367,289 A | 11/1994 | Baro et al. |
| 5,570,080 A | 10/1996 | Inoue et al. |
| 5,589,819 A | 12/1996 | Takeda |
| 5,610,587 A | 3/1997 | Fujiuchi et al. |
| 5,640,144 A | 6/1997 | Russo et al. |
| 5,656,998 A | 8/1997 | Fujiuchi et al. |
| 5,764,147 A | 6/1998 | Sasagawa et al. |
| 5,767,773 A | 6/1998 | Fujiuchi et al. |
| 5,793,290 A | 8/1998 | Eagleson et al. |
| 5,808,548 A | 9/1998 | Sasagawa et al. |
| 5,838,234 A | 11/1998 | Roulleaux-Robin |
| 5,864,290 A | 1/1999 | Toyomi et al. |
| 5,955,951 A | 9/1999 | Wischerop et al. |
| 5,982,283 A | 11/1999 | Matsudaira et al. |
| 6,020,819 A | 2/2000 | Fujiuchi et al. |
| 6,037,879 A | 3/2000 | Tuttle |
| 6,043,744 A | 3/2000 | Matsudaira |
| 6,104,285 A | 8/2000 | Stobbe |
| 6,118,367 A | 9/2000 | Ishii |
| 6,137,414 A | 10/2000 | Federman |
| 6,144,299 A | 11/2000 | Cole |
| 6,255,951 B1 | 7/2001 | De La Huerga |
| 6,304,181 B1 * | 10/2001 | Matsudaira .................. 340/571 |
| 6,339,377 B1 * | 1/2002 | Naka et al. ................ 340/572.1 |
| 6,346,886 B1 | 2/2002 | De La Huerga |
| 6,420,971 B1 | 7/2002 | Leck et al. |
| 6,433,689 B1 | 8/2002 | Hovind et al. |
| 6,474,117 B2 | 11/2002 | Okuno |
| 6,512,457 B2 | 1/2003 | Irizarry et al. |
| 6,531,961 B2 | 3/2003 | Matsudaira |
| 6,535,130 B2 | 3/2003 | Nguyen et al. |
| 6,961,000 B2 | 11/2005 | Chung |
| 7,079,034 B2 * | 7/2006 | Stilp ........................ 340/573.1 |
| 7,102,509 B1 | 9/2006 | Anders et al. |
| 2007/0296595 A1 * | 12/2007 | Moore ..................... 340/572.7 |

\* cited by examiner

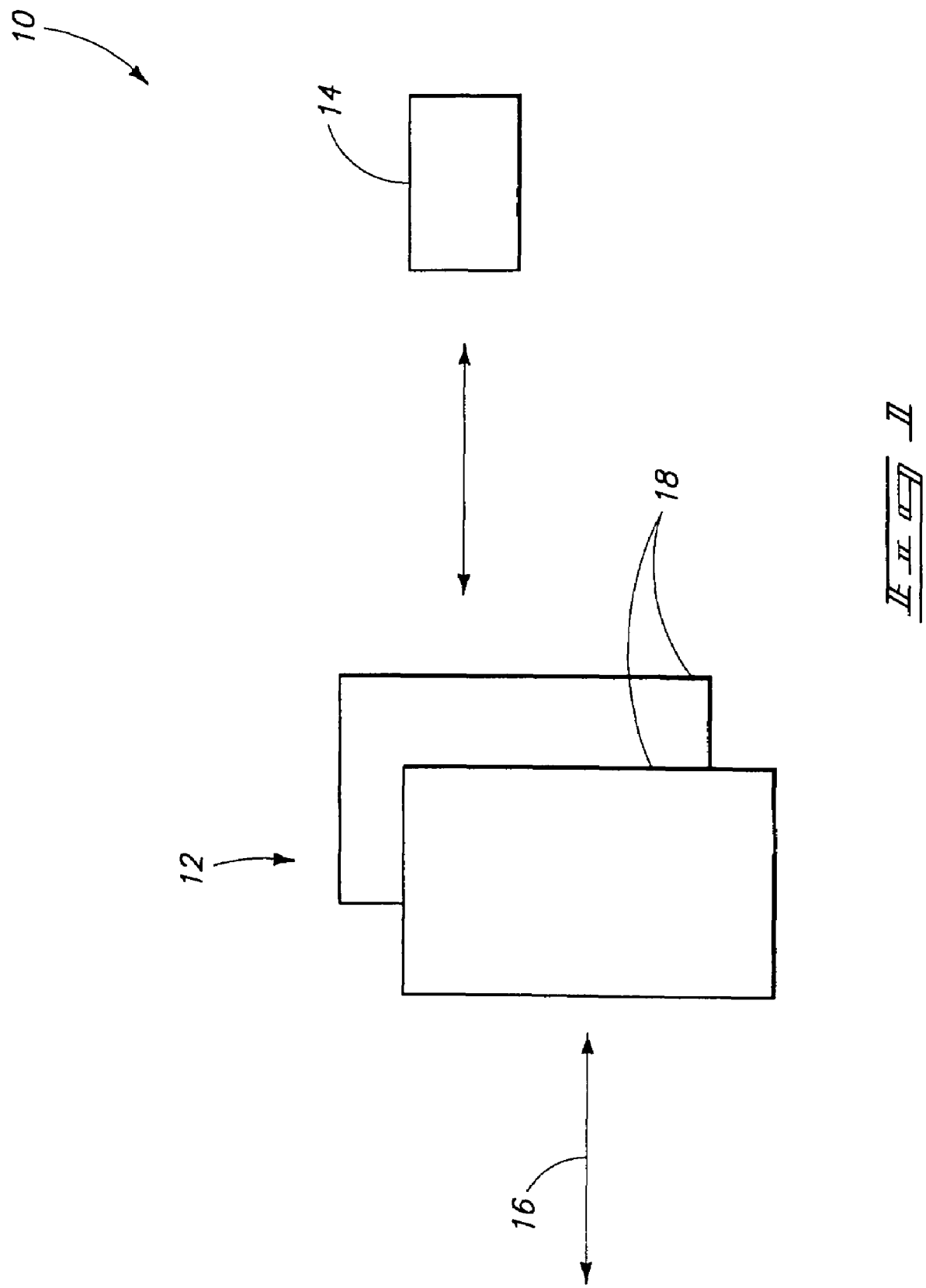

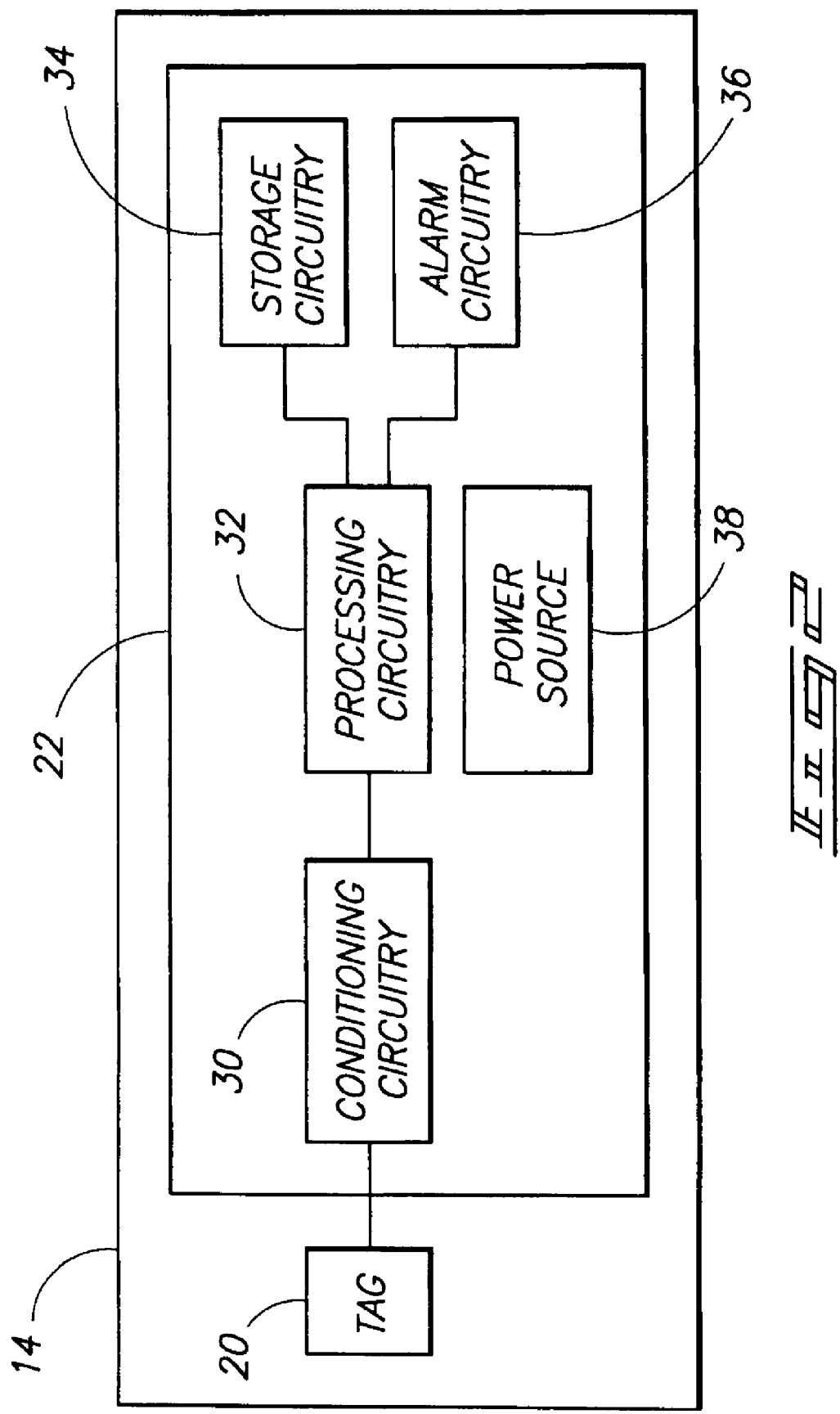

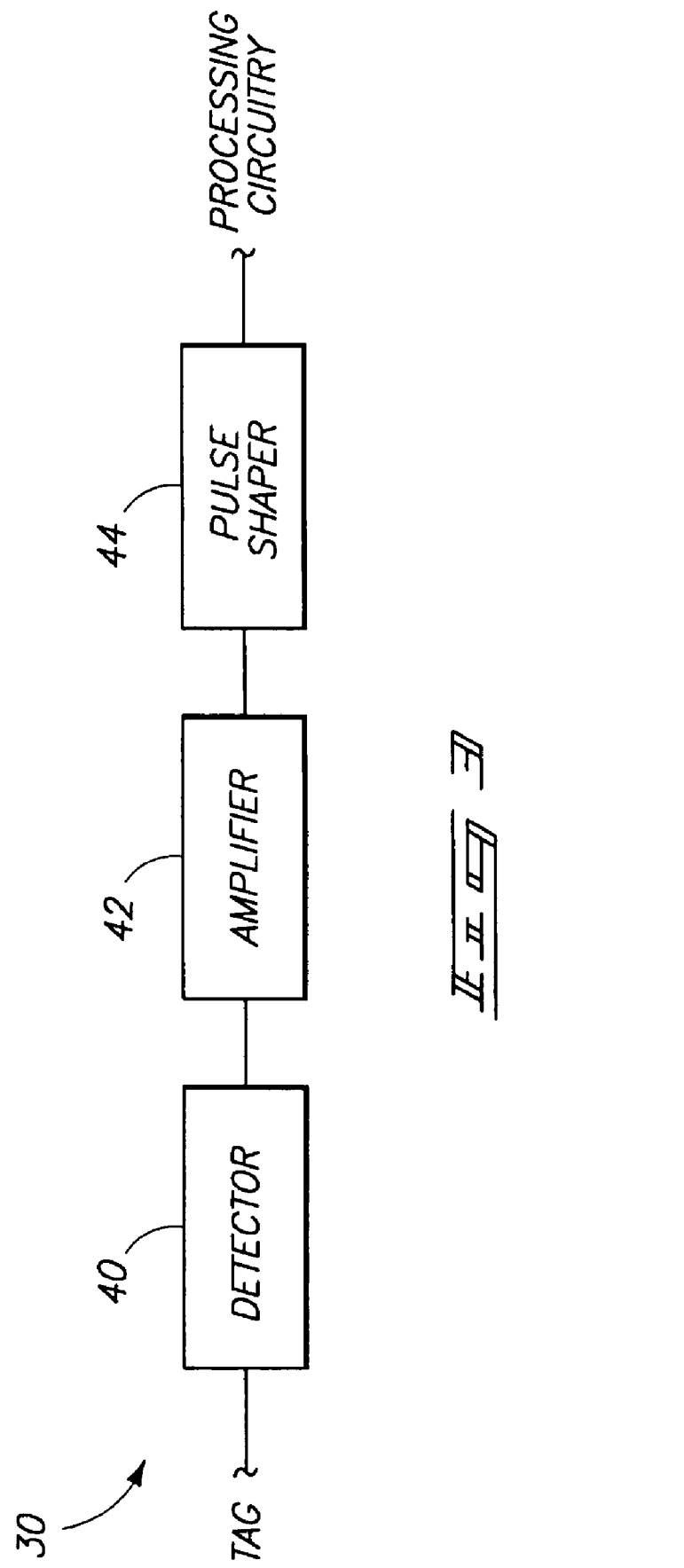

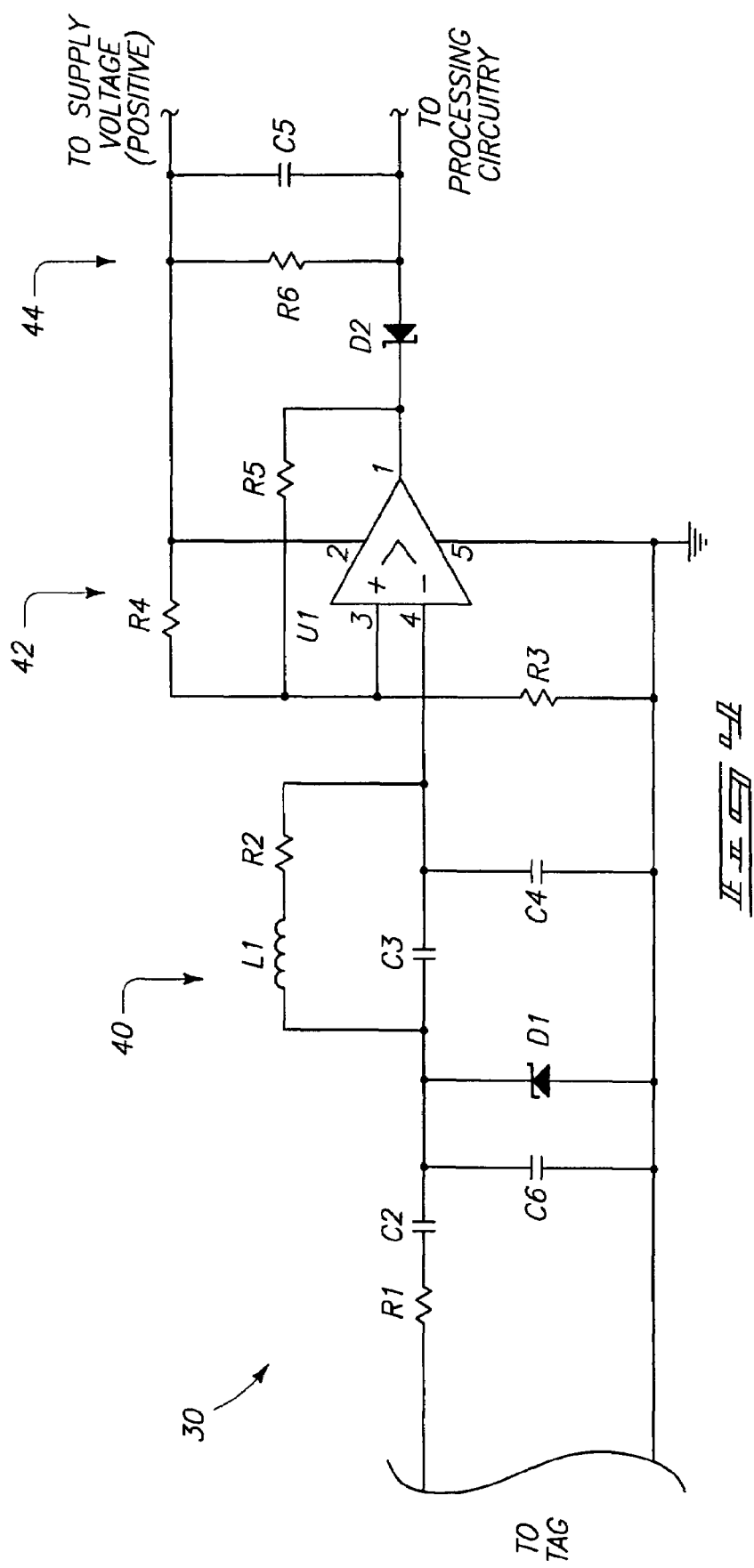

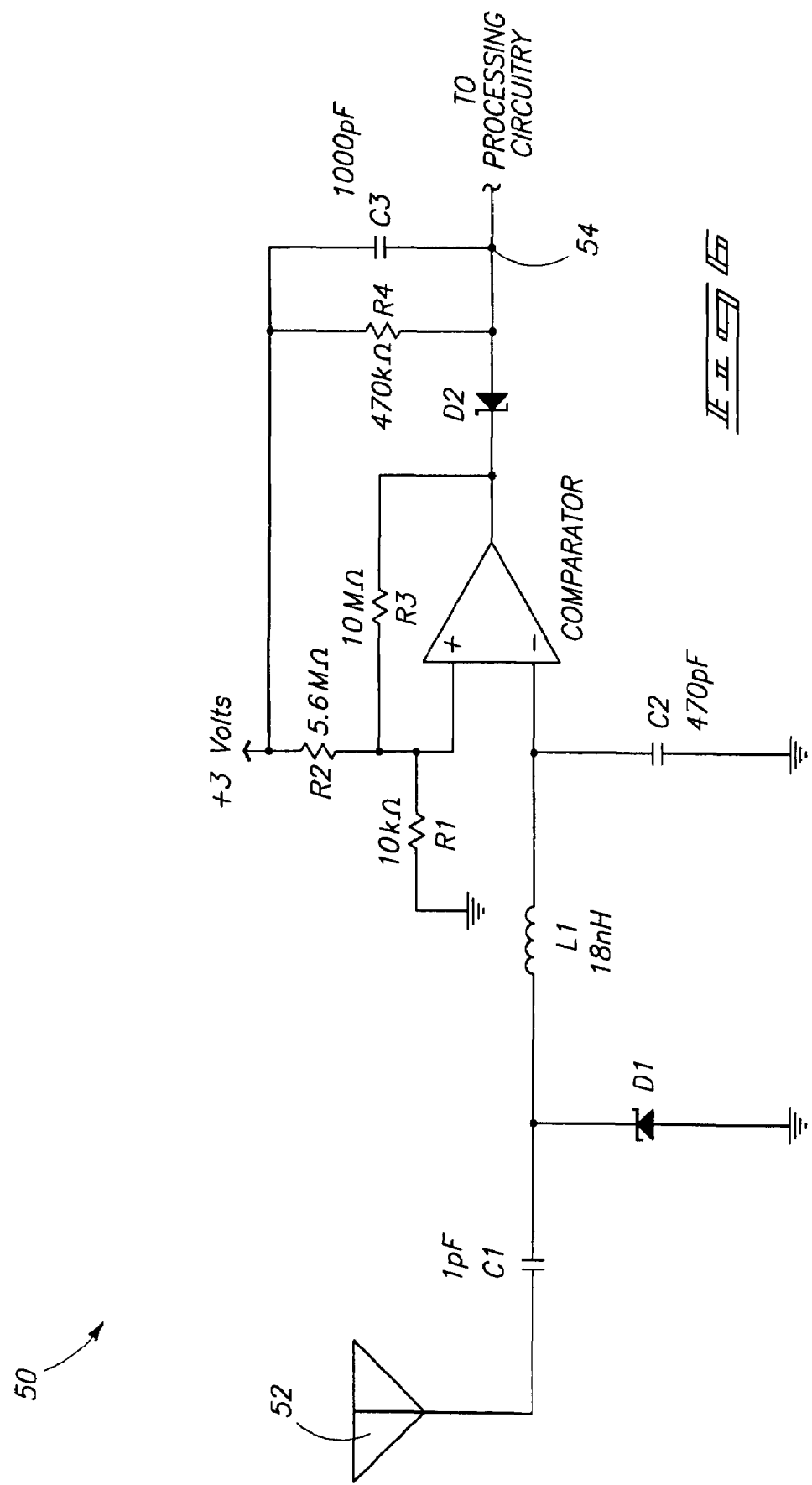

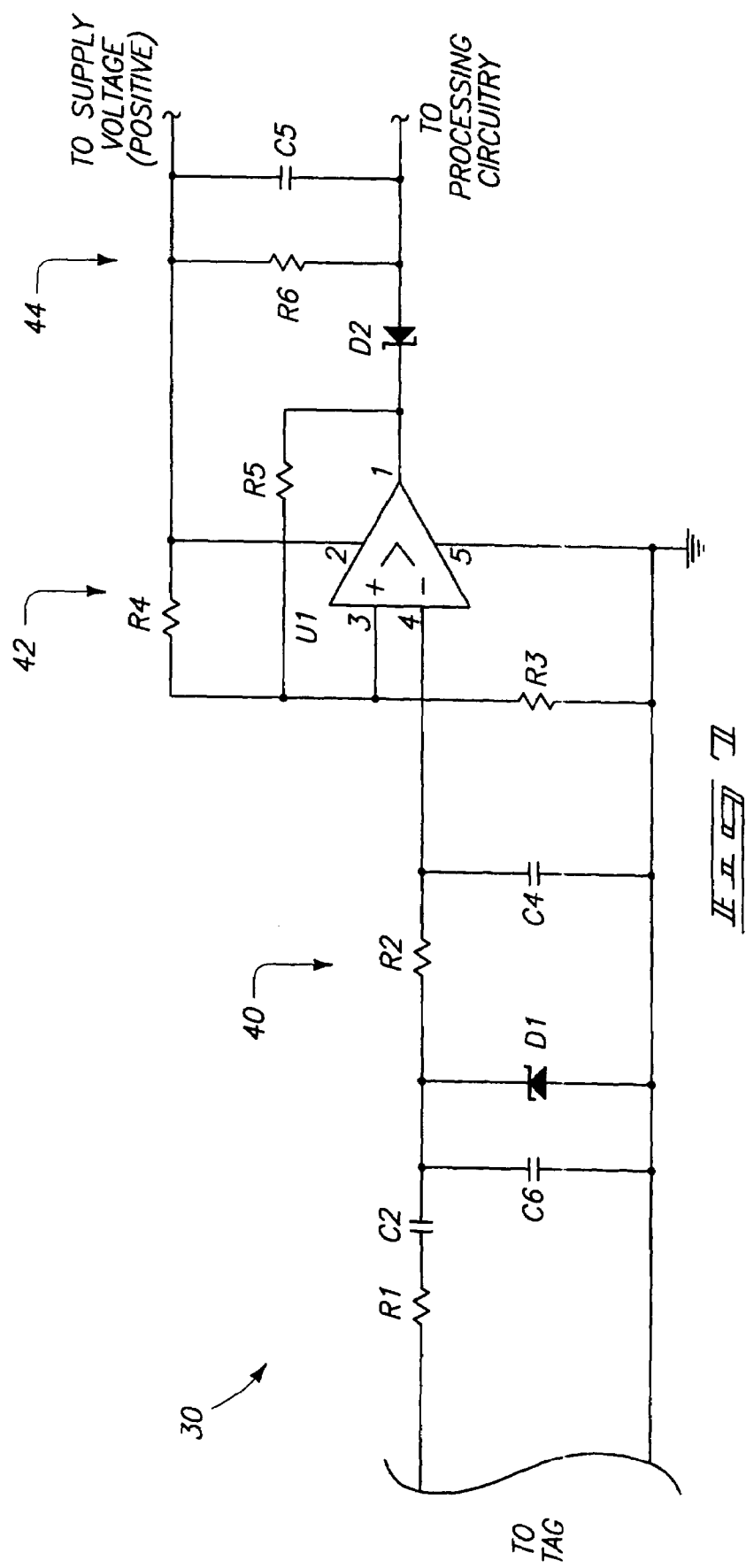

ALARM SYSTEMS, WIRELESS ALARM DEVICES, AND ARTICLE SECURITY METHODS

CLAIM FOR PRIORITY

This application claims priority to U.S. Provisional Patent Application Ser. No. 60/796,226, filed Apr. 28, 2006, entitled "Alarm Systems, Wireless Alarm Devices, And Article Security Methods", and the teachings are incorporated by reference herein.

TECHNICAL FIELD

This disclosure relates to alarm systems, wireless alarm devices, and article security methods.

BACKGROUND

Theft detection electronic systems have been used in numerous applications including for example consumer retail applications to deter theft. Some implementations of the theft detection electronic systems may utilize wireless communications to provide security. However, in some configurations of these systems, relatively low power consumption communications may be utilized providing issues with respect to accurate detection and communication. Additional issues may be raised because some components of the theft detection electronic systems may be portable, and accordingly, the components may rely upon battery power in some applications. For these particular implementations, it may be desired to reduce power consumption to extend the useful life of battery powered components of the theft detect electronic systems. Accordingly, in at least some system configurations, it is desired to avoid usage of relatively high current consuming circuits such as amplifiers.

At least some embodiments of the present disclosure describe apparatus and methods which provide improved communications.

BRIEF DESCRIPTION OF THE DRAWINGS

Embodiments of the disclosure are described below with reference to the following accompanying drawings.

FIG. 1 is an illustrative representation of an alarm system according to one embodiment.

FIG. 2 is a functional block diagram of a remote communication device according to one embodiment.

FIG. 3 is a functional block diagram of conditioning circuitry of a remote communication device according to one embodiment.

FIG. 4 is a schematic diagram of conditioning circuitry of a remote communication device according to one embodiment.

FIG. 5 is a map showing how FIGS. 5a and 5b are a flow chart of a method performed by a remote communication device according to one embodiment.

FIG. 6 is a schematic diagram of monitoring circuitry of a remote communication device according to one embodiment.

FIG. 7 is a schematic diagram of conditioning circuitry of a remote communication device according to one embodiment.

DETAILED DESCRIPTION

Figure 5A:
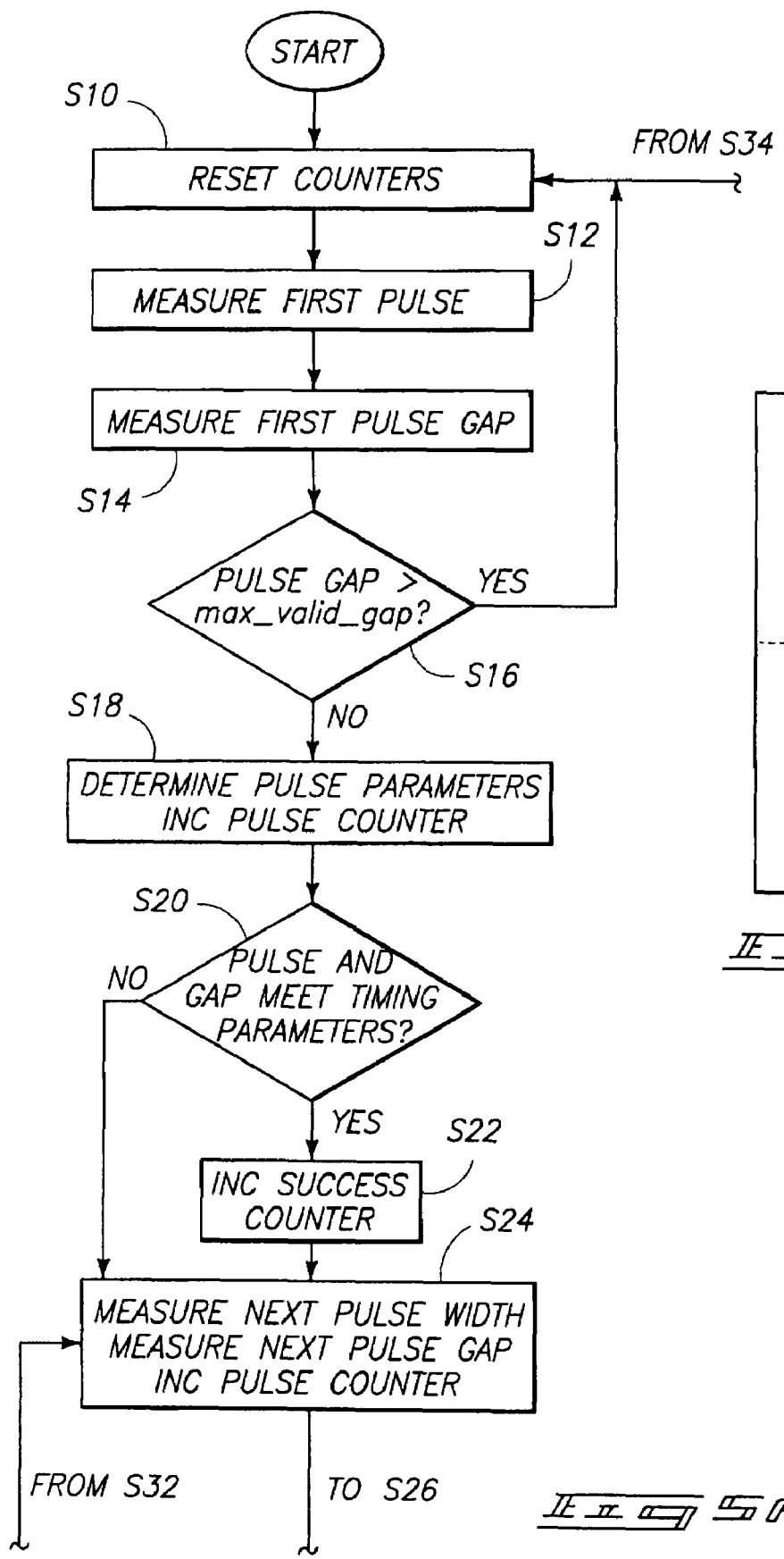
FIGS. 5a and 5b are to be assembled. Once assembled.

The reader is directed to other U.S. Patent Applications entitled "Alarm Systems, Wireless Alarm Devices, And Article Security Methods", naming Ian R. Scott, Brian J. Green and Dennis D. Belden, Jr. as inventors, having 60/795,851, and filed the same day as the present application, and entitled "Alarm Systems, Remote Communication Devices, And Article Security Methods", naming Ian R. Scott, Brian J. Green and Dennis D. Belden, Jr. as inventors, having 60/795,903, and filed the same day as the present application, and the teachings of both of which are incorporated by reference herein.

Referring to FIG. 1, an exemplary configuration of an alarm system according to one illustrative embodiment of the disclosure is shown with respect to reference 10. Alarm system 10 includes a base communication device 12 and one or more remote communication devices 14 remotely located with respect to base communication device 12 (only one device 14 is shown in FIG. 1). Remote communication devices 14 may be portable and moved with respect to base communication device 12 in one embodiment and may be referred to as wireless alarm units in some configurations. Base and remote communication devices 12, 14 are configured to implement wireless communications including radio frequency communications with respect to one another in the described embodiment.

In one exemplary implementation, alarm system 10 may be used to secure a plurality of articles (not shown). In a more specific example, alarm system 10 may be implemented in a consumer retail application to secure a plurality of articles including consumer items offered for sale. In some applications, a plurality of remote communication devices 14 may be used to secure a plurality of respective articles. The remote communication devices 14 may be individually associated with an article, for example, by attaching the remote communication device 14 to the article to be secured in one embodiment.

In one embodiment, alarm system 10 may be implemented to secure the articles which are to be maintained in a given location until authorization is provided to remove the articles from the location. For example, the alarm system 10 may be associated with a room, such as a retail store, and it may be desired to maintain the articles within a defined area (e.g., within the inside of the store) and to generate an alarm if an unauthorized attempt to remove an article from the defined area is detected. One exemplary configuration of alarm system 10 used in a retail article monitoring implementation is Electronic Article Surveillance (EAS). Alarm system 10 may implement different types of EAS monitoring in different embodiments. Examples of different configurations of EAS include AM (Acousto-Magnetic), EM (electromagnetic), and RF (Radio-Frequency).

Accordingly, in one embodiment, the base communication device 12 may be proximately located to an ingress and egress point 16 of a room. In the exemplary depicted embodiment, base communication device 12 includes a plurality of gates 18 located adjacent the ingress and egress point 16 (e.g., gates 18 may be positioned at opposing sides of a doorway of a retail store). In the described implementation, the gates 18 may emit wireless signals which define the secured area at the ingress and egress point 16 such that remote communication devices 14 pass through the secured area if they are brought into or removed from the defined area corresponding to the interior of the store (e.g., a defined area containing secured articles may be to the right of gates 18 in FIG. 1 and the left side of the gates may be unsecured). In one embodiment, a plurality of base communication devices 12 may be used to secure a single room or area if a plurality of points of ingress/egress are provided for the room or area.

Alarm system 10 is configured to generate an alarm responsive to the presence of one of the remote communication devices 14 being detected within a secured area. As described further below, the secured area may correspond to a range of wireless communications of gates 18 of base communication device 12, and in one example mentioned above, the gates 18 may be located adjacent an ingress and egress point 16 of a room containing secured articles. The base communication device 12 may emit wireless signals within and corresponding to the secured area and remote communication devices 14 brought into the secured area receive the wireless signals and may emit alarm signals in response to receiving the wireless signals. Accordingly, the secured area may be defined and used in one embodiment to generate alarms when remote communication devices 14 are adjacent to the ingress and egress point 16 in one configuration (i.e., generating an alarm to indicate a potential theft of an item by the bringing of the article having the remote communication device 14 attached thereto within the communications range of the base communication device 12 corresponding to the secured area).

Referring to FIG. 2, an exemplary configuration of a remote communication device 14 is shown according to one embodiment. In the illustrated configuration, remote communication device 14 includes a tag 20 coupled with an alarm device 22. A housing, such as a plastic case (e.g., corresponding to the box labeled as reference 14 in FIG. 2 in one embodiment), may be formed to house and protect one or both of tag 20 and/or alarm device 22 and the housing may be used to couple, attach, or otherwise associate the remote communication device 14 with an article to be secured. In exemplary embodiments, the housing may encase some or all of the components of device 14 while in other embodiments the housing may operate to support the components without encasing them. Any suitable housing to support components of device 14 may be used. Alarm device 22 includes conditioning circuitry 30, processing circuitry 32, storage circuitry 34, alarm circuitry 36 and a power source 38 in the exemplary depicted embodiment. Power source 38 may be provided in the form of a battery and coupled to provide operational electrical energy to one or more of conditioning circuitry 30, processing circuitry 32, storage circuitry 34 and/or alarm circuitry 36 in exemplary embodiments. Additional alternative configurations of remote communication device 14 and alarm device 22 are possible including more, less and/or alternative components in other embodiments.

Tag 20 is configured to implement wireless communications with respect to base communication device 12 in the described embodiment. In one construction, tag 20 includes an antenna circuit in the form of a parallel LC resonant circuit configured to resonate responsive to electromagnetic energy emitted by base communication device 12 (e.g., the inductor and capacitor may be connected in parallel between the nodes of R1 and ground in FIG. 4 in one embodiment). In one configuration, the inductor of the antenna circuit is a solenoid wire wound inductor configured to resonate at frequencies of communication of base communication device 12. In one embodiment, exemplary tags 20 may include electronic article surveillance (EAS) devices which are commercially available from numerous suppliers. As discussed further below, remote communication device 14 may generate a human perceptible alarm signal responsive to resonation of the antenna circuit. The alarm signal may indicate the presence of the remote communication device 12 (and associated article if provided) within a secured area, such as a doorway of a retail store.

Base communication device 12 is configured to emit electromagnetic energy for interaction with remote communication devices 14 to implement security operations. Base communication device 12 may omit the electromagnetic energy in the form of a wireless signal which has a different frequency at different moments in time. In one configuration, base communication device 12 emits a carrier frequency (e.g., less than 55 MHz) which may be frequency modulated wherein the carrier sweeps sinusoidally within a frequency range from a lower frequency to an upper frequency. For example, in one possible RF EAS implementation, base communication device 12 may emit a wireless signal in the form of a 8.2 MHz carrier which is FM modulated to sweep within a range between +/−500 kHz of 8.2 MHz at a rate of 60 Hz. In another embodiment, base communication device 12 may omit bursts of electromagnetic energy at different frequencies in the desired band of 8.2 MHz+/−500 kHz. Communications intermediate base and remote communication devices 12 and 14 may occur at other frequencies in other embodiments (e.g., AM EAS arrangements may communicate within a range of 55-58 kHz).

Remote communication devices 14 are individually configured to resonate at a range of frequencies within the modulated frequency range of the carrier signal emitted by the base communication device 12. For example, the LC components of the tag 20 may be tuned to resonate when the tag 20 is located within the secured area (and accordingly receives the electromagnetic energy emitted by the base communication device 12) and the carrier signal corresponds to the resonant frequency of the tag 20. For example, in one embodiment, the resonant frequency range of tag 20 is only a portion of the frequency range of the carrier (e.g., 8.2 MHz+/−500 KHz in one example) of the wireless signals from device 12. Furthermore, different devices 14 may resonate at different frequency range portions of the range of wireless communications of base communication device 12 in one embodiment. In one embodiment, the resonation may be detected by the base communication device 12 and may trigger the base communication device 12 to generate a human perceptible alarm.

The resonation of tag 20 results in the generation of a reference signal which is communicated to alarm device 22 resident within the remote communication device 14 in one embodiment. The reference signal may be referred to as a first electrical signal and include a signature (e.g., pattern of bursts) of alternating current energy corresponding to the carrier frequency of the signal communicated by base communication device 12 and at moments in time wherein the carrier frequency is equal to the resonant frequency of the tag 20. The reference signal may be communicated to conditioning circuitry 30 which may generate a pattern of plural identifiable components (e.g., pulses) individually corresponding to one of the bursts of AC energy. The pulses are received by processing circuitry 32 which may analyze the pulses in an attempt to distinguish pulses corresponding to electromagnetic energy emitted from the base communication device 12 from pulses resulting from electromagnetic of other sources, for example, corresponding to noise or interference. Upon detection of the receipt by device 14 of electromagnetic energy from base communication device 12, processing circuitry 32 may control alarm circuitry 36 to emit a human perceptible alarm.

In one embodiment, processing circuitry 32 is arranged to process data, control data access and storage, issue commands, and control other desired operations of remote communication device 14. Processing circuitry 32 may monitor signals which correspond to communications of base communication device 12. As discussed further below and according to one exemplary embodiment, processing circuitry 32 may analyze a pulse stream generated by conditioning circuitry 30 for pulse length and duty cycle. Processing circuitry 32 may use a discriminating window method which specifies a minimum number of pulses from a detected sequence to be within a set of parameters describing pulse on and off timing. Additional details of one exemplary analysis are described in detail below. Processing circuitry 32 may control the emission of an alarm signal by the remote communication device 14 if predefined parameters are met as discussed further below.

Processing circuitry 32 may comprise circuitry configured to implement desired programming provided by appropriate media in at least one embodiment. For example, the processing circuitry 32 may be implemented as one or more of a processor and/or other structure configured to execute executable instructions including, for example, software and/or firmware instructions, and/or hardware circuitry. Exemplary embodiments of processing circuitry 32 include hardware logic, PGA, FPGA, ASIC, state machines, and/or other structures alone or in combination with a processor. These examples of processing circuitry 32 are for illustration and other configurations are possible.

Storage circuitry 34 is configured to store programming such as executable code or instructions (e.g., software and/or firmware), electronic data, databases, or other digital information and may include processor-usable media. Processor-usable media may be embodied in any computer program product(s) or article of manufacture(s) which can contain, store, or maintain programming, data and/or digital information for use by or in connection with an instruction execution system including processing circuitry in the exemplary embodiment. For example, exemplary processor-usable media may include any one of physical media such as electronic, magnetic, optical, electromagnetic, infrared or semiconductor media. Some more specific examples of processor-usable media include, but are not limited to, a portable magnetic computer diskette, such as a floppy diskette, zip disk, hard drive, random access memory, read only memory, flash memory, cache memory, and/or other configurations capable of storing programming, data, or other digital information.

At least some embodiments or aspects described herein may be implemented using programming stored within appropriate storage circuitry 34 described above and/or communicated via a network or other transmission media and configured to control appropriate processing circuitry. For example, programming may be provided via appropriate media including, for example, embodied within articles of manufacture, embodied within a data signal (e.g., modulated carrier wave, data packets, digital representations, etc.) communicated via an appropriate transmission medium, such as a communication network (e.g., the Internet and/or a private network), wired electrical connection, optical connection and/or electromagnetic energy, for example, via a communications interface, or provided using other appropriate communication structure or medium. Exemplary programming including processor-usable code may be communicated as a data signal embodied in a carrier wave in but one example.

As mentioned above, alarm circuitry 36 may be configured to emit a human perceptible alarm signal (e.g., to notify interested parties of the fact that an article has been moved into a secured area). For example, alarm circuitry 36 may include an audible alarm and/or a visual alarm individually configured to emit human perceptible alarm signals.

Referring to FIG. 3, exemplary components of one embodiment of conditioning circuitry 30 intermediate tag 20 and processing circuitry 32 are shown. The illustrated conditioning circuitry 30 includes a detector 40, amplifier 42, and pulse shaper 44. Detector 40 is configured to detect the presence of the wireless communications generated by base communication device 12 using the first electrical signals received by the detector. In one embodiment, detector 40 is an RF detector configured to detect relatively low power signals (millivolt level). Detector 40 is configured to output second electrical signals corresponding to the received first electrical signals. As described below, the detector 40 may comprise a non-linear detector and the second electrical signals may have a non-linear relationship to the first electrical signals.

Amplifier 42 is configured to generate digital signals from the bursts of AC provided by the tag 20 and using the second electrical signals outputted by detector 40 in the illustrated embodiment. Pulse shaper 44 is configured to process the output of the amplifier 42 to assist processing circuitry 32 with detection of identifiable components (e.g., pulses) within the reference signal in the form of the second electrical signals. Additional details of the components of FIG. 3 are discussed immediately below in one embodiment.

Referring to FIG. 4, an exemplary configuration of conditioning circuitry 30 is shown. In the illustrated embodiment of FIG. 4, exemplary implementations of detector 40, amplifier 42 and pulse shaper 44 are shown. Detector 40 includes D1, L1, C4, amplifier 42 includes comparator U1, and pulse shaper includes D2 in the depicted arrangement. The illustrated circuit provides sensitivity to signals from base communication device 12 in the millivolt range while providing a detector 40 which is passive and consumes substantially no power from power source 38. Other circuits are possible including more, less and/or alternative components.

During operation, output of tag 20 due to resonation with electromagnetic energy and comprising the first electrical signals is detected by a non-linear device comprising diode D1 in the depicted embodiment. More specifically, coupling capacitor C2 connects signals generated by tag 20 to the detector 40 while allowing for a DC shift which becomes the output signal. Diode D1 conducts in a forward biased direction when the RF signal received by tag 20 is negative thereby clamping the waveform to ground and is non-conducting when the RF signal is positive thereby developing a positive signal corresponding to the instantaneous value of the peak of the RF waveform (e.g., 8.2 MHz) generated by base communication device 12 for half of the wave cycle thereby providing a DC or slowly varying AC waveform that is proportional to the amplitude of the RF signal received by tag 20. The inclusion of a non-linear element D1 in the detector 40 improves the sensitivity of alarm device 22 of remote communication device 14. In one embodiment, the described diode D1 provides a non-linear relationship wherein current through diode D1 is clamped to ground during the negative half cycle and allowed to swing positive during the positive half cycle of received voltage corresponding to electrical signals received from tag 20 and an output signal is provided to C4 which is therefore proportional to the positive peak value of the received signal. The detected DC component signal is DC coupled and AC blocked by the inductor to C4. C4 holds the value of the detected voltage. Accordingly, in one embodiment, C4 of detector 40 is configured to generate an envelope of the signal and generally resemble a square wave following the macro trend of the RF envelope of signals received from base communication device 12.

In the depicted embodiment, C3 is coupled across the inductor L1 and is selected to provide parallel resonance of the component combination at the band of frequencies that are transmitted by base communication device 12 thereby increasing the AC impedance of the circuit connected to tag 20. The increased impedance reduces loading of tag 20 so that the voltage developed across it is higher thereby improving sensitivity and providing increased reflection by the antenna circuitry of tag 20 of signals to base communication device 12. The provision of detector 40 comprising a non-linear detector through the use of diode D1 generates pulses having an absolute value relation to the signal received by the antenna circuit and applies the pulses to comparator U1 in one embodiment. Detector 40 has a non-linear transfer characteristic in the described embodiment where the input and output of the detector 40 have an absolute value relationship through the use of diode D1 in one embodiment.

The detector 40 described according to one embodiment provides increased sensitivity to wireless communications of base communication device 12 without the use of amplifiers operating at RF frequencies which otherwise may consume significant current and significantly reduce battery life.

The reference signal outputted by detector 40 is converted to a logic level by comparator U1 and associated components R3, R4, and R5 of amplifier 42. The logic level reference signal is provided to pulse shaper 44. D2 of pulse shaper 44 removes noise from the output of the comparator and provides relatively clean pulses for analysis by processing circuitry 32. D2 allows a fast fall time of the detected RF signal and a slower rise time of a prescribed rate as set by R6 and C5 which also operates to provide a degree of noise reduction.

A table of values of an exemplary configuration of conditioning circuitry 30 configured for use with tag 20 comprising a parallel LC resonant circuit having a solenoid wire wound inductor of 9.7 uH and a capacitor of 39 pF is provided as Table A. Other components may be used in other configurations and/or for use with other configurations of tags 20.

TABLE A

| Component | Part Name/Value |
|---|---|
| R1 | 3K |
| R2 | 150 |
| R3 | 2.4K |
| R4 | 5.6M |
| R5 | 10M |
| R6 | 470K |
| C2 | 1 pF |
| C3 | 2 pF |
| C4 | 100 pF |
| C5 | 1000 pF |
| C6 | 0.5 pF |
| L1 | 100 uH |
| D1 | SMS7621 |
| D2 | BAS70 |
| U1 | LPV7215 |

Processing circuitry 32 is configured to receive reference signals outputted from pulse shaper 44 and is configured to process the reference signals in the form of the second electrical signals to discriminate signals having a pattern or cadence corresponding to wireless communications of base communication device 12 from other signals resulting from the reception of electromagnetic energy provided by other sources apart from device 12. Processing circuitry 32 may control the alarm circuitry 36 to generate a human perceptible alarm responsive to the discrimination indicating reception of wireless communications corresponding to base communication device 12.

Processing circuitry 32 may use criteria in an attempt to discriminate received electromagnetic energy. The criteria may be predefined wherein, for example, the criteria is specified prior to reception of the wireless signals to be processed by remote communication device 14. In one possible discrimination embodiment, processing circuitry 32 is configured to monitor for the presence of a plurality of identifiable components within the reference signals outputted by conditioning circuitry 30 and corresponding to communications of the remote communication device 14 with respect to base communication device 12 (e.g., the remote communication device 14 generates the identifiable components responsive to reception of the wireless signal emitted by the base communication device 12). In one embodiment, the processing circuitry 32 is configured to monitor for the presence of the identifiable components in the form of pulses. As described further below, processing circuitry 32 may attempt to match pulses of the reference signal being processed with a predefined pattern of the pulses in one implementation to discriminate communications from the base communication device 12 from interference. The processing circuitry 32 may control the alarm circuitry 36 to emit an alarm if criteria are met, such as identification of a plurality of identifiable components (e.g., pulses) and/or identification of the identifiable components in the form of a predefined pattern. The processing circuitry 32 may have to specify the reception of the identifiable components and/or pattern within a predefined time period in order to provide a positive identification of communications from base communication device 12. One, more or all of the above exemplary criteria may be used in exemplary embodiments to discriminate signals from base communication device 12 from spurious electromagnetic energy received by the remote communication devices 14.

More specifically, in one arrangement, processing circuitry 32 may access values for a plurality of parameters corresponding to the given configuration of the alarm system 10 (e.g., RF, AM, EM discussed above). The processing circuitry 32 may utilize the values of the parameters during monitoring of reference signals received from conditioning circuitry 30 and which specify time-amplitude criteria to discriminate communications from base communication device 12 from interference. The values of the parameters may define characteristics of the identifiable components (e.g., pulses) of the signal and to be identified. In a specific example, the parameters may additionally define a pattern of the identifiable components to be identified to indicate whether the communications are from base communication device 12. The values of the parameters for the different types of systems may be predefined (e.g., defined before the generation of the reference signals to be processed) in one embodiment. For example, the values for the different configurations may be preprogrammed into the remote communication devices 14 prior to use of the devices in the field and the appropriate set of values may be selected corresponding to the type of alarm system 10 being utilized.

Exemplary parameters for the identifiable components and/or patterns of identifiable components may include minimum and maximum pulse width parameters, minimum and maximum pulse gap parameters, maximum valid pulse gap, number of pulses, and success count. The pulse width parameters are used to define the widths of the pulses to be monitored. The pulse gap parameters define the minimum and maximum length of time intermediate adjacent pulses, and the maximum valid pulse gap corresponds to a length of time wherein a timeout occurs if no additional pulse is received after a previous pulse. In one embodiment, the processing circuitry 32 may perform a moving window analysis wherein a given number of correct pulses defined by the success count parameter are attempted to be located within a moving window of pulses defined by the number of pulses parameter. Additional details regarding monitoring of identifiable components in the form of pulses with respect to a predefined pattern of the pulses are described with respect to FIG. 5.

Figure 5B:
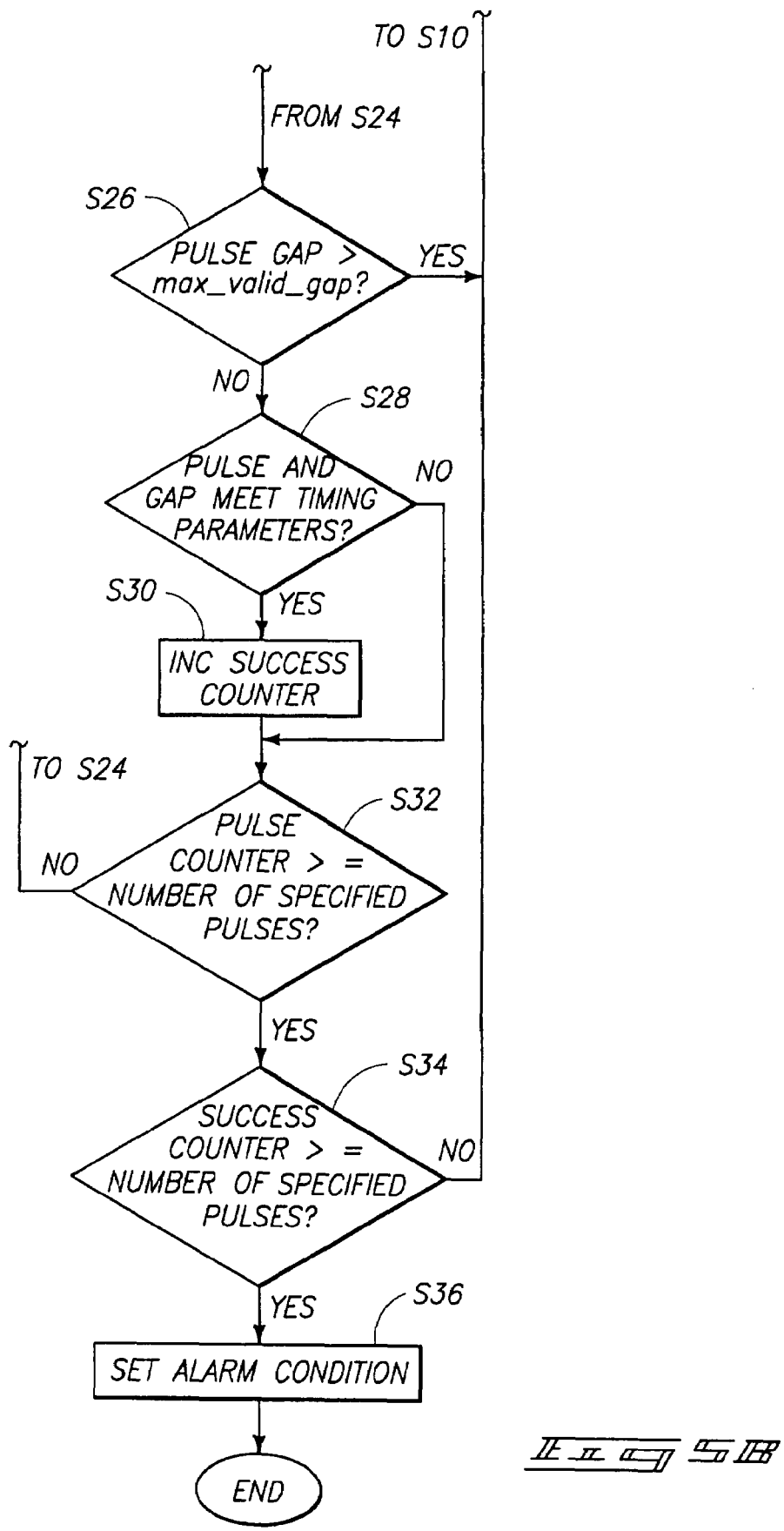

Referring to FIG. 5, an exemplary method of processing of reference signals is shown according to one embodiment. The method may be performed in an attempt to discriminate electromagnetic energy generated by base communication device 12 and received by remote communication device 14 from electromagnetic energy resulting from other sources and received by remote communication device 14. In one example, processing circuitry 32 is configured to perform the method, for example, by executing ordered instructions. Other methods are possible, including more, less and/or alternative steps.

At a step S10, all counters are reset. Exemplary counters include a pulse_cnt counter corresponding to a number of pulses counted and a success_cnt counter corresponding to a number of pulses counted which meet respective values of the parameters.

At a step S12, a width of a first pulse from pulse shaper circuitry is detected and measured.

At a step S14, a pulse gap after the first pulse is measured.

At a step S16, it is determined whether the gap measured in step S14 exceeds a max_valid_gap parameter. This parameter may correspond to a timeout. If the condition is affirmative, the process returns to step S10 wherein the counters are reset. If the condition is negative, the process proceeds to step S18.

At step S18, pulse timing of a plurality of pulses outputted from the pulse shaper circuitry may be performed. The determined pulse timing may be used to select one of a plurality of sets of values for parameters to be monitored. For example, different sets of values may be predefined and used for different configurations of alarm system 10. In one embodiment, once the pulse timing is determined, the pulse timing may be used to select a respective appropriate set of values. Furthermore, at step S18, the pulse_cnt counter may be incremented corresponding to the pulse detected at step S12.

At a step S20, the width of the pulse detected at step S12 and the following gap are calculated and compared to the set of values for the respective pulse width and gap parameters. If the measurements are negative in view of the parameter values, the process proceeds to a step S24. If the measurements are positive (e.g., matching) in view of the parameter values, the process proceeds to a step S22.

At step S22, the success_cnt counter is incremented indicating detection of a pulse within the values of the parameters.

At a step S24, the subsequent pulse width and gap is measured and the pulse_cnt counter is incremented.

At a step S26, the pulse gap is again compared to the max_valid_gap parameter. If the condition of step S26 is affirmative, the process returns to step S10 indicating a timeout. If the condition of step S26 is negative, the process proceeds to a step S28.

At step S28, the measured pulse width and gap are compared with the selected values of the parameters. If the measurements are negative in view of the parameter values, the process proceeds to a step S32. If the measurements are positive in view of the parameter values, the process proceeds to a step S30.

At step S30, the success_cnt counter is incremented indicating detection of a pulse within the values of the parameters.

At a step S32, it is determined whether a desired number of pulses have been detected. In one example, the process waits until ten pulses have been detected. If the condition of step S32 is negative, the process returns to step S24. If the condition of step S32 is affirmative, the process proceeds to step S34.

At step S34, it is determined whether a desired number of successful pulses have been detected. In the above-described example monitoring ten pulses, the process at step S34 may monitor a condition for the presence of at least five of the ten pulses meeting the criteria specified by the selected values. Other criteria may be used for steps S32 and 34 in other embodiments. If the condition of step S34 is negative, the process returns to step S10 and no alarm is generated by remote communication device 14. If the condition of step S34 is affirmative, the process proceeds to step S36.

At step S36, the process has discriminated electromagnetic energy received via the remote communication device 14 as having been emitted from base communication device 12 from electromagnetic energy resulting from other sources. The discrimination indicates the presence of the remote communication device 14 in a secured area and the processing circuitry 32 can control the emission of an alarm signal.

At least some of the above-described exemplary embodiments provide an advantage of discrimination using the remote communication device 14 of communications of base communication device 12 from other spurious electromagnetic energy which may be emitted from other sources. Further, at least one embodiment of remote communication device 14 provides relatively very low signal strength signal detection, negligible impact to performance of tag 20 with respect to communications with base communication device 12, and relatively low power consumption.

Further, the alarm system 10 may have improved discrimination in the presence of cellular and cordless telephones and other sources of interference which may otherwise preclude reliable detection of signals form base communication device 12 for example in an electronic article surveillance system. Accordingly, the alarm system 10 according to one embodiment may have reduced susceptibility to false alarms caused by interference.

Referring to FIG. 6, one possible embodiment of monitoring circuitry 50 which may be included in remote communication device 14 is shown. Monitoring circuitry 50 may be coupled with processing circuitry 32 in one implementation. Monitoring circuitry 50 is configured to reduce false alarms in some configurations due to the presence of spurious electromagnetic energy (e.g., electromagnetic energy not emitted by system 10) in the environment where system 10 is implemented. In one arrangement described below, monitoring circuitry 50 is configured to monitor for the presence of spurious electromagnetic energy and generate an output which may be utilized to reduce the presence of false alarms.

In one embodiment, monitoring circuitry 50 reduces false alarms which may exist with certain kinds of spurious electromagnetic interference. The illustrated configuration of monitoring circuitry 50 is arranged to monitor for interference which may have a similar characteristic (e.g., time signature) to wireless communications generated by base communication device 12 (e.g., the signature used to identify communications of device 12) and which may cause a false alarm by remote communication device 14. For example, GSM phones transmit at substantially different frequencies of approximately 850-1900 MHz compared with one embodiment of wireless communications of system 10 at 8.2 MHz. However, transmitted signals of GSM phones may be sufficient to induce currents by radiation that trigger an embodiment of remote communication device 14. The triggering may be due to a similarity of the GSM interference with a possible signature of the wireless communications of base communication device 12.

In exemplary embodiments, monitoring circuitry 50 is tuned to a frequency of spurious electromagnetic energy (e.g., GSM interference) and is not tuned to the frequency band of wireless communications of base communication device 12. For example, in the depicted embodiment, monitoring circuitry 50 is tuned to receive and demodulate spurious electromagnetic energy (e.g., a GSM phone transmission or other high frequency interference signal for example) outside of the frequency band of communications of base communication device 12. In one embodiment, an antenna 52 of monitoring circuitry 50 may be tuned to a frequency band such as 100 MHz-5 GHz in configurations of alarm system 10 which use communications within a band of approximately 8.2 MHz.

An output node 54 of monitoring circuitry 50 may be coupled with processing circuitry 32. Processing circuitry 32 may process signals received from output node 54 with respect to respective signals received from conditioning circuitry 30. Processing circuitry 32 may analyze respective signals from circuitry 30, 50 which correspond to one another in time to determine whether output of conditioning circuitry 30 having an appropriate signature is responsive to communications of base communication device 12 or spurious electromagnetic energy. The output of monitoring circuitry 50 permits processing circuitry 32 to discriminate electrical signals received from conditioning circuitry 30 which result from communications of base communication device 12 from those which result from spurious electromagnetic energy in the illustrated configuration. As described further below, the processing circuitry 32 may perform the discrimination analysis based upon the output of monitoring circuitry 50.

The above described embodiment is configured such that monitoring circuitry 50 detects possible sources of spurious electromagnetic energy which may impact the operations of alarm system 10 yet rejects proper communications of base communication device 12. In an example implementation of alarm system 10 where spurious electromagnetic energy is present which may impact proper operation of alarm system 10, both receivers of conditioning circuitry 32 and monitoring circuitry 50 may indicate the presence of a signal which resembles communications of base communication device 12 (e.g., having a signature corresponding to communications of base communication device 12) but results from the spurious electromagnetic energy. However, during communications of base communication device 12 within a proper frequency band (e.g., 8.2 MHz), only conditioning circuitry 30 generating electrical signals which indicate the presence of the communications of base communication device 12 are generated and while monitoring circuitry 50 does not.

If the output electrical signals of the receivers of conditioning circuitry 30 and monitoring circuitry 50 are both active at a respective moment in time and with a respective time signature which resembles communications of base communication device 12, then the presence of spurious electromagnetic energy is indicated and processing circuitry 32 ignores the potential false alarm condition and does not control the generation of an alarm signal by alarm circuitry 36. If however, the output electrical signal from monitoring circuitry 50 is inactive yet the output electrical signal from conditioning circuitry 30 at the respective moment in time is active with a valid signature, then a potential alarm condition is due to a legitimate communication from base communication device 12 and processing circuitry 32 may control alarm circuitry 36 to emit an alarm signal. Furthermore, if an output electrical signal of the monitoring circuitry 50 is active and the respective output electrical signal of the conditioning circuitry 30 is not active, processing circuitry 32 does not control the emission of an alarm signal in the described embodiment.

Antenna 52 may be implemented as a separate dedicated piece of wire serving as a monopole antenna tuned to a frequency range of spurious electromagnetic energy to be monitored in one configuration. Also, in the depicted embodiment of FIG. 6, monitoring circuitry 50 operates similarly to conditioning circuitry 30 wherein a coupling capacitor C1 couples RF energy to a nonlinear detector diode D1 while allowing for a DC shift so that the comparatively slow varying signal (e.g., generated from the envelope of a GSM cell phone or other unintentional source of interference) is allowed to develop across the diode D1. Non-linear element diode D1 develops an electrical signal that is proportional to the envelope of the spurious electromagnetic energy. This electrical signal is coupled to holding capacitor C2 by inductor L1 which is an electrical short at low frequencies and open at higher frequencies so as to minimize loading of the antenna signal. The value of C2 may be optimized for an expected timing sequence of spurious electromagnetic energy (if known or predictable). The values of C1, C2, and L1 may be chosen in one embodiment such that communications of base communication device 12 are greatly attenuated yet the comparatively high frequency of spurious electromagnetic energy is optimized and detected. In the described embodiment, monitoring circuitry 50 is active responsive to spurious electromagnetic energy and is inactive or rejects communications of base communication device 12. Therefore, the output electrical signal of monitoring circuitry 50 is only a representation of the spurious electromagnetic energy. The remaining components of monitoring circuitry 50 operate similarly to corresponding respective components of conditioning circuitry 30 in the depicted exemplary embodiment.

Due to the nature of unintentional injection of relatively very high frequencies (e.g., >100 MHz) in some implementations, it may be more straightforward to develop monitoring circuitry 50 that receives relatively very high frequencies yet rejects relatively strong levels of comparatively low 8.2 MHz signals. In some embodiments, it may be more difficult to design a receiver of conditioning circuitry 30 which receives relatively low frequency 8.2 MHz and is not susceptible to the relatively high levels of spurious electromagnetic energy which may be present (e.g., radio frequency energy of a GSM phone).

Referring to FIG. 7, another possible configuration of conditioning circuitry 30 is shown including an alternate detector circuit which is less frequency selective when connected to a tag antenna (compared with the embodiment of FIG. 4) and is accordingly slightly more sensitive to lower level signals.

Detector 40 includes D1, R2, C4, amplifier 42 includes comparator U1, and pulse shaper includes D2 in the depicted arrangement of FIG. 7. The illustrated circuit provides sensitivity to signals from base communication device 12 in the milliVolt range while providing a detector 40 which is passive and consumes substantially no power from power source 38. Other circuits are possible including more, less and/or alternative components.

During operation, output of tag 20 due to resonation with electromagnetic energy and comprising the first electrical signals is detected by a non-linear device comprising diode D1 in the depicted embodiment. More specifically, coupling capacitor C2 connects signals generated by tag 20 to the detector 40 while allowing for a DC shift which becomes the output signal. Diode D1 conducts in a forward biased direction when the RF signal received by tag 20 is negative thereby clamping the waveform to ground and is non-conducting when the RF signal is positive thereby developing a positive signal corresponding to the instantaneous value of the peak of the RF waveform (e.g., 8.2 MHz) generated by base communication device 12 for half of the wave cycle thereby providing a DC or slowly varying AC waveform that is proportional to the amplitude of the RF signal received by tag 20. The inclusion of a non-linear element D1 in the detector 40 improves the sensitivity of alarm device 22 of remote communication device 14. In one embodiment, the described diode D1 provides a non-linear relationship wherein current through diode D1 is clamped to ground during the negative half cycle and allowed to swing positive during the positive half cycle of received voltage corresponding to electrical signals received from tag 20 and an output signal is provided to C4 which is therefore proportional to the positive peak value of the received signal. The detected DC component signal is coupled by R2 and AC filtered by R2 and C4. C4 holds the value of the detected voltage. Accordingly, in one embodiment, C4 of detector 40 is configured to generate an envelope of the signal and generally resemble a square wave following the macro trend of the RF envelope of signals received from base communication device 12.

The provision of detector 40 comprising a non-linear detector through the use of diode D1 generates pulses having an absolute value relation to the signal received by the antenna circuit and applies the pulses to comparator U1 in one embodiment. Detector 40 has a non-linear transfer characteristic in the described embodiment where the input and output of the detector 40 have an absolute value relationship through the use of diode D1 in one embodiment.

The detector 40 described according to one embodiment provides increased sensitivity to wireless communications of base communication device 12 without the use of amplifiers operating at RF frequencies which otherwise may consume significant current and significantly reduce battery life.

The reference signal outputted by detector 40 is converted to a logic level by comparator U1 and associated components R3, R4, and R5 of amplifier 42. The logic level reference signal is provided to pulse shaper 44. D2 of pulse shaper 44 removes noise from the output of the comparator and provides relatively clean pulses for analysis by processing circuitry 32. D2 allows a fast fall time of the detected RF signal and a slower rise time of a prescribed rate as set by R6 and C5 which also operates to provide a degree of noise reduction.

A table of values of an exemplary configuration of conditioning circuitry 30 configured for use with tag 20 comprising a parallel LC resonant circuit having a solenoid wire wound inductor of 9.7 uH and a capacitor of 39 pF is provided as Table B. Other components may be used in other configurations and/or for use with other configurations of tags 20.

TABLE B

| Component | Part Name/Value |
| --- | --- |
| R1 | 3K |
| R2 | 100K |
| R3 | 2.4K |
| R4 | 5.6M |
| R5 | 10M |
| R6 | 470K |
| C2 | 1 pF |
| C4 | 100 pF |
| C5 | 1000 pF |
| C6 | 0.5 pF |

TABLE B-continued

| Component | Part Name/Value |
| --- | --- |
| D1 | SMS7621 |
| D2 | BAS70 |
| U1 | LPV7215 |

In compliance with the statute, the disclosure has been described in language more or less specific as to structural and methodical features. It is to be understood, however, that the disclosure is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

Further, aspects herein have been presented for guidance in construction and/or operation of illustrative embodiments of the disclosure. Applicant(s) hereof consider these described illustrative embodiments to also include, disclose and describe further inventive aspects in addition to those explicitly disclosed. For example, the additional inventive aspects may include less, more and/or alternative features than those described in the illustrative embodiments. In more specific examples, Applicants consider the disclosure to include, disclose and describe methods which include less, more and/or alternative steps than those methods explicitly disclosed as well as apparatus which includes less, more and/or alternative structure than the explicitly disclosed apparatus.

What is claimed is:

1. An alarm system comprising:
a base communication device configured to communicate wireless signals within a range of frequencies;
a remote communication device configured to communicate with the base communication device using the wireless signals, wherein the remote communication device is adapted to be associated with an article to be secured and wherein the remote communication device comprises alarm circuitry;
wherein the remote communication device comprises an antenna circuit configured to receive the wireless signals communicated by the base communication device and to generate first electrical signals corresponding to respective ones of the received wireless signals, and the remote communication device further comprises a detector comprising a non-linear device configured to receive the first electrical signals and to provide second electrical signals having a non-linear relationship to the first electrical signals, wherein the detector further comprises a parallel LC circuit configured to provide increased impedance at the range of frequencies of the wireless signals compared with other frequencies outside of the range of frequencies; and
wherein the remote communication device further comprises processing circuitry coupled with the non-linear device and configured to process the second electrical signals and to control the alarm circuitry to generate a human perceptible alarm responsive to the processing.

2. The system of claim 1 wherein the base communication device is configured to communicate the wireless signals within a secured area and the resonant circuit is configured to receive the wireless signals while the remote communication device is located within the secured area.

3. The system of claim 2 wherein the base communication device is positioned to emit the wireless signals to define the secured area at a point of ingress and egress of a defined area wherein the article is secured.

4. The system of claim 1 wherein the non-linear device comprises a diode.

5. The system of claim 1 wherein the detector is passive.

6. The system of claim 5 wherein the remote communication device comprises a power source configured to supply operational electrical energy to the processing circuitry, and wherein the detector is configured to provide the second electrical signals without consuming electrical energy from the power source.

7. The system of claim 1 wherein the base communication device is configured to output the wireless signals having different frequencies within the range of frequencies comprising a first range of frequencies at a plurality of different moments in time, and wherein the detector is configured to generate the second electrical signals responsive to the wireless signals having frequencies within a second range of frequencies comprising only a portion of the first range of frequencies.

8. The system of claim 7 wherein the antenna circuit comprises a parallel LC resonant circuit configured to resonate at the second range of frequencies.

9. The system of claim 1 wherein the processing circuitry is configured to identify the second electrical signals as corresponding to the wireless signals communicated by the base communication device, and wherein the processing circuitry is configured to control the generation of the human perceptible alarm responsive to the identification.

10. The system of claim 1 wherein the base communication device is configured to communicate the wireless signals having frequencies less than 55 MHz.

11. A wireless alarm device comprising:
a housing adapted to couple with an article to be secured;
a diode coupled with the housing and configured to receive first electrical signals corresponding to wireless signals communicated by a base communication device of an alarm system and to generate second electrical signals responsive to the reception of the first electrical signals;
alarm circuitry coupled with the housing and configured to generate a human perceptible alarm; and
processing circuitry configured to process the second electrical signals including identifying individual ones of a plurality of pulses of the second electrical signals as corresponding to the wireless signals communicated by the base communication device, and to control the alarm circuitry to generate the human perceptible alarm responsive to the identification.

12. The device of claim 11 further comprising an antenna circuit coupled with the housing and configured to generate the first electrical signals.

13. The device of claim 12 wherein the wireless signals have different frequencies within a first range of frequencies at different moments in time, and wherein the antenna circuit is tuned to a second range of frequencies which is only a portion of the first range of frequencies and the antenna circuit is configured to generate the first electrical signals responsive to the wireless signals being within the second range of frequencies.

14. The device of claim 13 wherein the antenna circuit comprises a parallel LC resonant circuit tuned to resonate at the second range of frequencies.

15. The device of claim 11 wherein the diode is configured to generate the second electrical signals having a non-linear relationship to the first electrical signals.

16. The device of claim 11 further comprising a detector comprising the diode, and wherein the detector is passive.

17. The device of claim 13 further comprising a detector comprising the diode, and wherein the detector further comprises a parallel LC circuit coupled to the diode and tuned to provide increased impedance at the second range of frequencies.

18. An article security method comprising:
associating a remote communication device of an alarm system with an article to be secured;
emitting a wireless signal within a secured area using a base communication device of the alarm system;
moving the remote communication device and the associated article into the secured area;
receiving the wireless signal using the remote communication device located within the secured area;
using the remote communication device, generating a first electrical signal corresponding to the wireless signal;
using a detector of the remote communication device, generating a second electrical signal having a non-linear relationship with respect to the first electrical signal, the detector providing an increased impedance at frequencies of the wireless signal emitted by the base communication device compared with other frequencies; and
using the remote communication device, emitting a human perceptible alarm responsive to the generating the second electrical signal.

19. The method of claim 18 wherein the emitting comprises emitting the wireless signal to define the secured area at a point of ingress and egress of a defined area wherein the article is secured.

20. The method of claim 18 wherein the generating the first electrical signal comprises resonating a parallel LC resonant circuit of the remote communication device using the wireless signal.

21. The method of claim 20 further comprising detecting the resonating using the base communication device, and generating another human perceptible alarm using the base communication device responsive to the detecting.

22. The method of claim 18 wherein the generating the second electrical signal comprises generating using a non-linear device.

23. The method of claim 18 wherein the generating the second electrical signal comprises generating using a diode.

24. The method of claim 18 wherein the generating the second electrical signal comprises generating without consuming electrical energy of a power source of the remote communication device.

25. The method of claim 18 wherein the emitting comprises emitting a plurality of wireless signals having different frequencies over a first range of frequencies at different moments in time, and wherein the generating the first electrical signal comprises generating a plurality of first electrical signals responsive to the wireless signals having frequencies within a second range of frequencies which is only a portion of the first range of frequencies.

26. The method of claim 25 wherein the detector provides the increased impedance at the frequencies within the first range of frequencies.

27. The method of claim 18 further comprising identifying the wireless signal as corresponding to communications of the base communication device, and wherein the emitting comprises emitting responsive to the identifying.

28. An article security method comprising:
receiving a wireless signal comprising resonating an antenna circuit of a remote communication device, the resonating generating a first electrical signal;

using the remote communication device, generating a second electrical signal responsive to the generating the first electrical signal, the second electrical signal having a non-linear relationship with respect to the first electrical signal; and generating a human perceptible alarm to indicate the presence of the remote communication device and an article associated with the remote communicate device within a secured area; and identifying the wireless signal as being a communication from a base communication device of an alarm system comprising the remote communication device, the identifying comprising identifying a predefined pattern of a plurality of pulses within the second electrical signal, and wherein the generating the human perceptible alarm comprises generating responsive to the identifying.

29. The method of claim 28 further comprising emitting the wireless signal within the secured area using the base communication device of an alarm system.

30. The method of claim 29 wherein the emitting comprises emitting a plurality of wireless signals having a plurality of different frequencies within a first range of frequencies at a plurality of different moments in time, and the resonating comprises resonating during the emitting of the wireless signals having frequencies within a second range of frequencies which is only a portion of the first range of frequencies.

31. The method of claim 30 providing increased impedance at the second range of frequencies.

32. The method of claim 30 wherein the resonating comprises resonating using the antenna circuit comprising a parallel LC resonant circuit tuned to the second range of frequencies.

33. The method of claim 28 wherein the generating the second electrical signal comprises generating using a diode.

34. The method of claim 28 wherein the generating the second electrical signal comprises generating using a non-linear device.

35. The method of claim 28 wherein the generating the second electrical signal comprises generating using passive circuitry without consuming electrical energy of a power source of the remote communication device.

36. The method of claim 28 wherein the identifying comprises identifying the predefined pattern comprising a pattern defined before the generating of the second electrical signal.

37. The method of claim 28 wherein the identifying comprises identifying widths of the pulses and gaps intermediate adjacent ones of the pulses matching the predefined pattern.

* * * * *